L. A. KREJCI.
CYLINDER BORING DEVICE.
APPLICATION FILED JAN. 25, 1921.
1,438,316.
Patented Dec. 12, 1922.
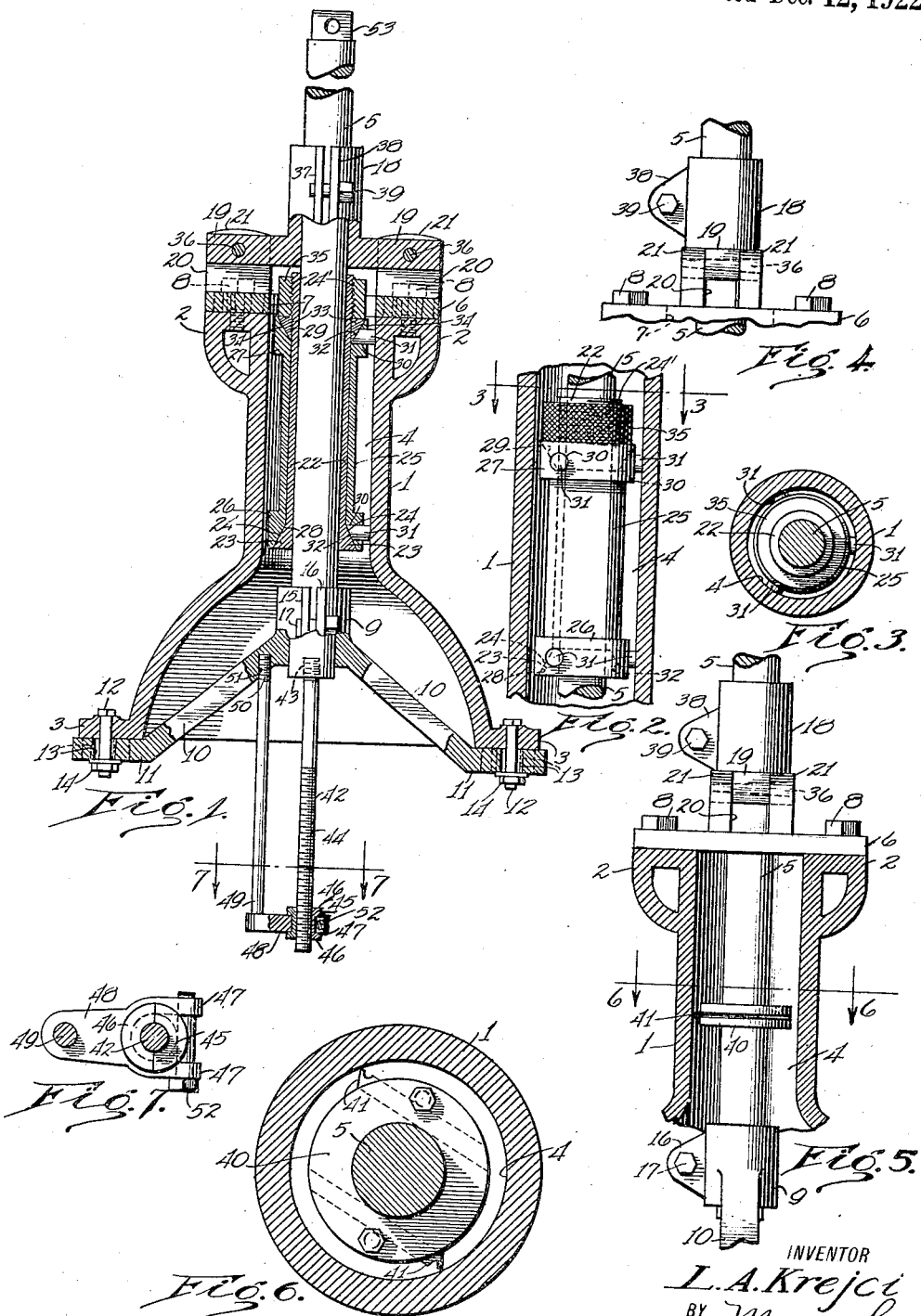
INVENTOR
L. A. Krejci
BY Munn & Co.
ATTORNEYS Patented Dec. 12, 1922.

1,438,316

UNITED STATES PATENT OFFICE.

LADDIE ALOIS KREJCI, OF CHICAGO, ILLINOIS.

CYLINDER-BORING DEVICE.

Application filed January 25, 1921. Serial No. 439,796.

*To all whom it may concern:*

Be it known that I, LADDIE ALOIS KREJCI, a citizen of the United States, and a resident of Chicago, in the county of Cook and State of Illinois, have invented a new and useful Improvement in Cylinder-Boring Devices, of which the following is a full, clear, and exact description.

My invention relates to improvements in boring devices, and it consists in the combinations, constructions and arrangements herein described and claimed:

An object of my invention is to provide a device for boring or reaming cylinders that has means for centering a boring bar or spindle thereof with respect to the inner wall of the cylinder and for maintaining the bar or spindle in adjusted position while permitting free functional movement thereof.

A further object of my invention is to provide a device of the type described that has means for controlling the longitudinal movement of the boring bar or spindle relative to the cylinder to be re-bored during the operation thereof, whereby uniformity and accuracy of the cut made is assured.

A further object of my invention is to provide a device of the type described that is relatively simple in construction and operation, thoroughly effective for the purpose intended and not likely to get out of order easily.

Other objects and advantages will appear in the following specification, and the novel features of the invention will be pointed out in the appended claims.

My invention is illustrated in the accompanying drawings, forming part of this application, in which Fig. 1 is a central section through a cylinder showing the use and application of the device, Fig. 2 is a detail of a fragmentary portion of the device showing the engagement of the same with the inner wall of the cylinder, Fig. 3 is a section along the line 3—3 of Fig. 2, Fig. 4 is a view of a fragmentary portion of the device, Fig. 5 is a view similar to Fig. 1, showing the device in operative position, Fig. 6 is a section along the line 6—6 of Fig. 5, Fig. 7 is a section along the line 7—7 of Fig. 1.

Referring now to the drawings, 1 denotes a cylinder that is conventional in construction and has flanges 2 and 3 at the ends thereof. In carrying out my invention, I project into the bore 4 of the cylinder a boring bar or spindle 5. A head 6 having an opening 7 therethrough registering with the bore 4 of the cylinder rests on the flange 2 and is secured thereto in any suitable manner as by means of bolts 8.

The boring bar or spindle 5 is loosely supported at one end by a bracket bearing consisting of a sleeve 9 mounted on the same and having diverging arms 10 bent at 11 parallel with the flange 3 for engaging therewith and being loosely secured thereto by bolts 12. The latter are projected through openings in the flange 3 and substantially alined openings 13 in the end portions of the arms 11, nuts 14 being screwed on the ends of the bolts 12. The openings 13 have a diameter greater than that of the bolts 12 and consequently a limited movement of the arms 10 relative to the cylinder walls is permitted until the nuts 14 have been adjusted to clamp the ends of the arms 10 tightly against the flange 3. The collar 9 is preferably split longitudinally and provided with cooperating lugs 15 and 16, which are maintained in adjusted position relative to each other by means of a bolt 17, whereby the sleeve 9 can be adjusted to fit spindles varying in size and can also be selectively adjusted relative to the spindle 5 to permit and prevent relatively free movement of the latter therethrough. The spindle 5 is loosely supported adjacent its opposite end by means of a sleeve 18 that is mounted on the spindle and is formed with diametrically opposed lateral extensions 19 that are arranged to enter diametrically opposed slots 20 in upstanding lugs 21. The latter are integral with the head 6.

Prior to placing the sleeve 18 on the spindle 5, the mechanism used in centering the spindle 5 within the bore of the cylinder is inserted within the bore of the cylinder. Such a mechanism comprises an inner sleeve 22 that is slidably mounted on the spindle 5 and is moved therealong into the position shown. The inner sleeve 22 is enlarged at its inner end at 23 and is threaded exteriorly at 24' adjacent its opposite end. The outer wall of the enlarged portion 23 is beveled at 24. Mounted on the inner sleeve is a second or outer sleeve 25 that is enlarged at both ends thereof at 26 and 27 so that the outer walls of the enlarged portions are concentric with the inner walls of the cylinder 1 and are equal in diameter. The inner walls of the enlarged portions 26 and 27 are beveled at 28 and 29, respectively, and the angle of inclination of the beveled wall 28 is complementary to the angle of the beveled wall 24 of the inner sleeve 22. The enlarged portions 26 and 27 are each formed with a plurality of spaced apart radially extending openings 30 through their walls and in these openings are slidable pins 31 that have their inner ends beveled at 32 at the same angle as the beveled walls 28 and 29. A spacing washer 33 has its outer wall beveled at 34 complementary to the beveled wall 29 and is mounted on the inner sleeve 22. Obviously, when a jam nut 35 is screwed on the threaded portion 24' of the inner sleeve 22, the spacing washer will be forced along the latter into engagement with the beveled wall 29 of the outer sleeve and continued operation of the jam nut 35 will cause the pins 31 to be moved outwardly against the inner wall of the cylinder 1, thereby centering the boring bar or spindle 5. The jam nut 35 has its outer wall knurled in order that the same may be conveniently operated.

When the spindle 5 has been centered in the manner described, the collar 18, which was placed on the spindle after the centering mechanism has been arranged within the bore of the cylinder as hereinbefore pointed out, is secured in adjusted position relative to the head 6 by means of pins 36 that are projected transversely through the lugs 20 and 21, as shown. The collar 18 is preferably split and provided with cooperating lugs 37 and 38 which are secured together by means of a bolt 39 or the like so that the collar may be adjusted to the spindle 5 to prevent play of the same therein while permitting longitudinal movement of the same therethrough. The spindle 5 is then further secured in its centered position by tightening the bolt 17 that secures the lugs 15 and 16 of the collar 19 together and by tightening the nuts 14 to clamp the nut portions of the bracket arms 10 rigidly to the flange 3 of the cylinder.

From the foregoing description of the various parts of the device, the operation thereof may be readily understood. When the spindle 5 has been centered with respect to the bore of the cylinder and secured in adjusted position in the manner hereinbefore described, the collar 18 is removed from the spindle and the centering mechanism then withdrawn from the bore of the cylinder and from the spindle. A holder or head 40 that is provided with cutters 41 is then placed on the spindle and secured thereto in any suitable manner. The collar 18 is again mounted on the spindle 5 and secured to the head 6 in the manner hereinbefore described. A feed screw 42 embodying a rod having a threaded end thereof engaging a threaded socket 43 in the end of the spindle 5 is co-axially alined with the latter and is threaded at 44 for the greater part of its length. This feed screw works in a threaded nut or collar 45 having flanges 46 at the ends thereof and held between the forks 47 of a bracket arm 48 that is carried by a rod 49. The latter is parallel with the feed screw 42 and has its upper end thereof threaded at 50 for engagement with a threaded socket 51 in one of the arms 10 of the bracket bearing. It will be noted that the nut or sleeve 45 is formed of two identical half portions that are maintained in the position shown by means of a bolt or pin 52 projected transversely through the forks 47 of the bracket arm 48.

It will also be understood that the cylinder 1 will be rigidly supported in any suitable manner before the boring operation is commenced, no means for supporting the same being shown in the drawings. The spindle 5 may be turned by hand and the end thereof is therefore squared at 53 for engagement with a crank handle (not shown). When the spindle 5 is rotated the engagement of the feed screw 42 with the threaded sleeve or nut 45 will occasion a longitudinal movement of the boring head 40 relative to the cylinder 1 and the extent of this movement during each revolution of the spindle is determined by the pitch of the screw. Consequently the cut effected by the rotary movement of the spindle 5 will be uniform and regular throughout the entire length of the cylinder.

I claim:

1. A device of the type described comprising a spindle adapted to be disposed in a cylinder, and means for centering said spindle with respect to the wall of the cylinder, said means comprising a sleeve slidably disposed on said spindle, said sleeve having one of its ends threaded, and its other end being fashioned with a tapered projection, a second sleeve slidably mounted on said first named sleeve and having the ends of its bore tapering outwardly, said sleeve having a plurality of transverse openings adjacent each end thereof, a tapering washer slidably disposed on said first named sleeve and being disposed adjacent to the threaded portion thereof, a nut disposed on the threaded portion of said first named sleeve, and pins disposed in the openings of said second named sleeve and being adapted to abut the wall of the cylinder.

2. In a device of the type described, a sleeve, said sleeve having one of its ends threaded, and its other end being fashioned with a tapered projection, a second sleeve slidably mounted on said first named sleeve and having the ends of its bore tapering outwardly, said sleeve having a plurality of transverse openings adjacent each end thereof, a tapering washer slidably disposed on said first named sleeve and being disposed adjacent to the threaded portion thereof, a nut disposed on the threaded portion of said first named sleeve, and pins disposed in the openings of said second named sleeve.

3. In a device of the type described, a spindle, a sleeve slidably disposed on said spindle, said sleeve having one of its ends threaded, and its other end being fashioned with a tapered projection, a second sleeve slidably mounted on said first named sleeve and having the ends of its bore tapering outwardly, said sleeve having a plurality of transverse openings adjacent each end thereof, a tapering washer slidably disposed on said first named sleeve and being disposed adjacent to the threaded portion thereof, a nut disposed on the threaded portion of said first named sleeve, and pins disposed in the openings of said second named sleeve.

4. In a device of the type described, a head adapted to be secured to a cylinder, two pairs of lugs carried by said head, each pair of lugs having alined openings therein, a sleeve having extensions adapted to be disposed between said pairs of lugs, said extensions having openings therein which are adapted to be alined with the openings of said lugs, and pins adapted to be disposed in the openings of said lugs and said extensions.

LADDIE ALOIS KREJCI.